(12) United States Patent
Umeyama

(10) Patent No.: US 8,531,597 B2
(45) Date of Patent: Sep. 10, 2013

(54) VIDEO PROCESSING APPARATUS THAT STORES INPUT VIEWPOINT INFORMATION AND CONTROL METHOD THEREOF

(75) Inventor: Manabu Umeyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 13/112,432

(22) Filed: May 20, 2011

(65) Prior Publication Data

US 2011/0293241 A1  Dec. 1, 2011

(30) Foreign Application Priority Data

Jun. 1, 2010 (JP) ................................. 2010-126295
Mar. 29, 2011 (JP) ................................. 2011-073416

(51) Int. Cl.
*H04N 7/08* (2006.01)

(52) U.S. Cl.
USPC ....................................... 348/385.1; 386/341

(58) Field of Classification Search
USPC ............................. 386/341; 348/385.1, 387.1
See application file for complete search history.

(56) References Cited

U.S. PATENT DOCUMENTS

| | | | | |
|---|---|---|---|---|
| 5,894,320 A | * | 4/1999 | Vancelette | 725/138 |
| 2005/0273830 A1 | * | 12/2005 | Silver et al. | 725/105 |
| 2005/0286759 A1 | * | 12/2005 | Zitnick et al. | 382/154 |
| 2006/0045481 A1 | * | 3/2006 | Yahata et al. | 386/95 |
| 2008/0040753 A1 | * | 2/2008 | Anandpura et al. | 725/60 |
| 2010/0026712 A1 | * | 2/2010 | Aliprandi et al. | 345/629 |
| 2011/0229054 A1 | * | 9/2011 | Weston et al. | 382/276 |

FOREIGN PATENT DOCUMENTS

| | | |
|---|---|---|
| JP | 2007-150747 | 6/2007 |
| JP | 2010-088017 | 4/2010 |

* cited by examiner

*Primary Examiner* — David Harvey
(74) *Attorney, Agent, or Firm* — Cowan, Liebowitz & Latman, P.C.

(57) ABSTRACT

A video processing apparatus stores input viewpoint information which indicates on a viewpoint of video to be displayed that of video content constituted by a plurality of videos captured at a plurality of respectively different viewpoint positions. At this time, the input viewpoint information is stored in association with at least one of identification information for identifying the video content and captured viewpoint information that includes information on the plurality of viewpoint positions at which the plurality of videos constituting the video content are captured. The viewpoint corresponding to the stored input viewpoint information is displayed as a selectable viewpoint based on at least one of the identification information and the captured viewpoint information of the video content, when viewing video content that is different from the video content for which the input viewpoint information is already registered.

16 Claims, 8 Drawing Sheets

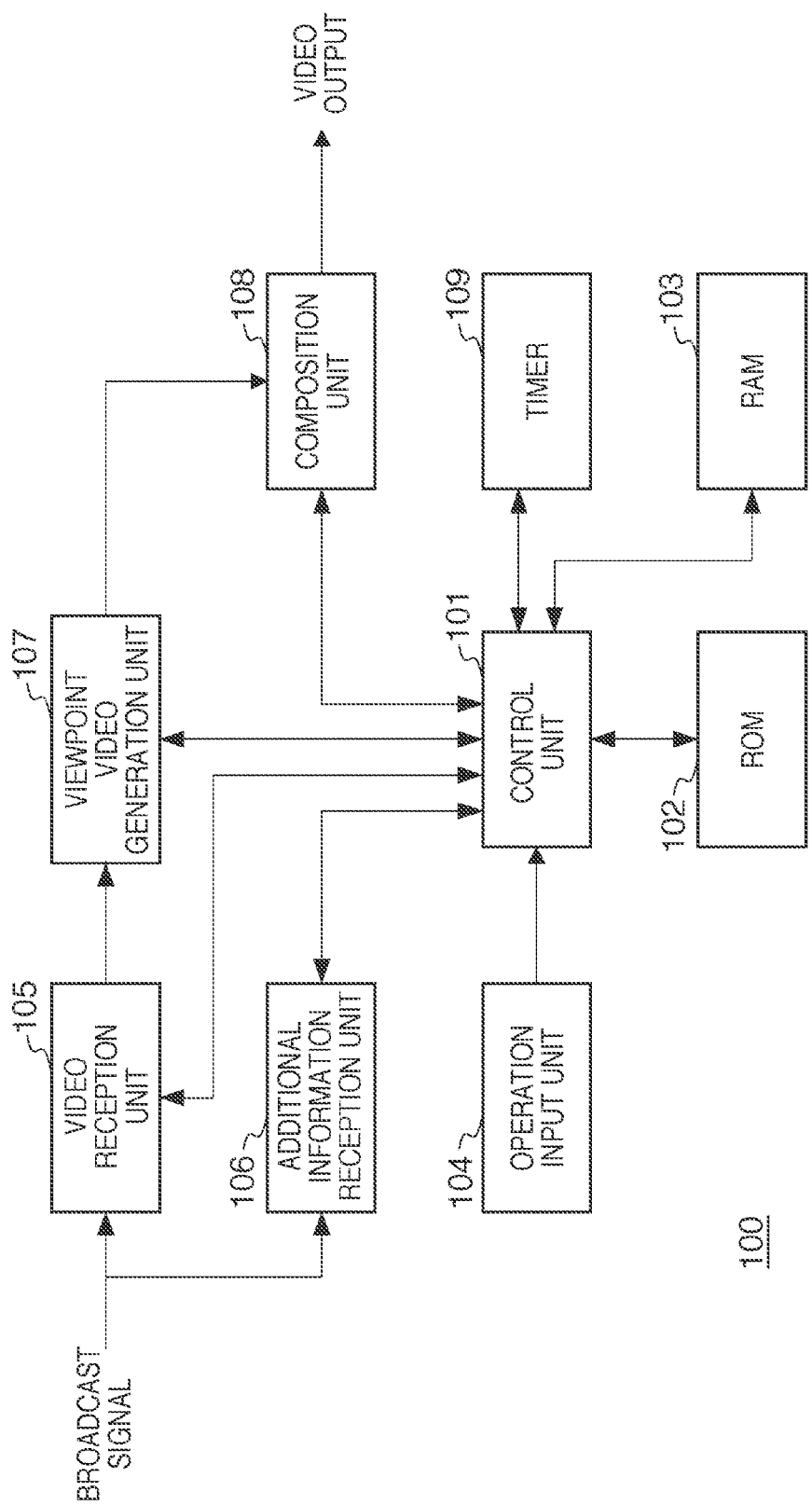

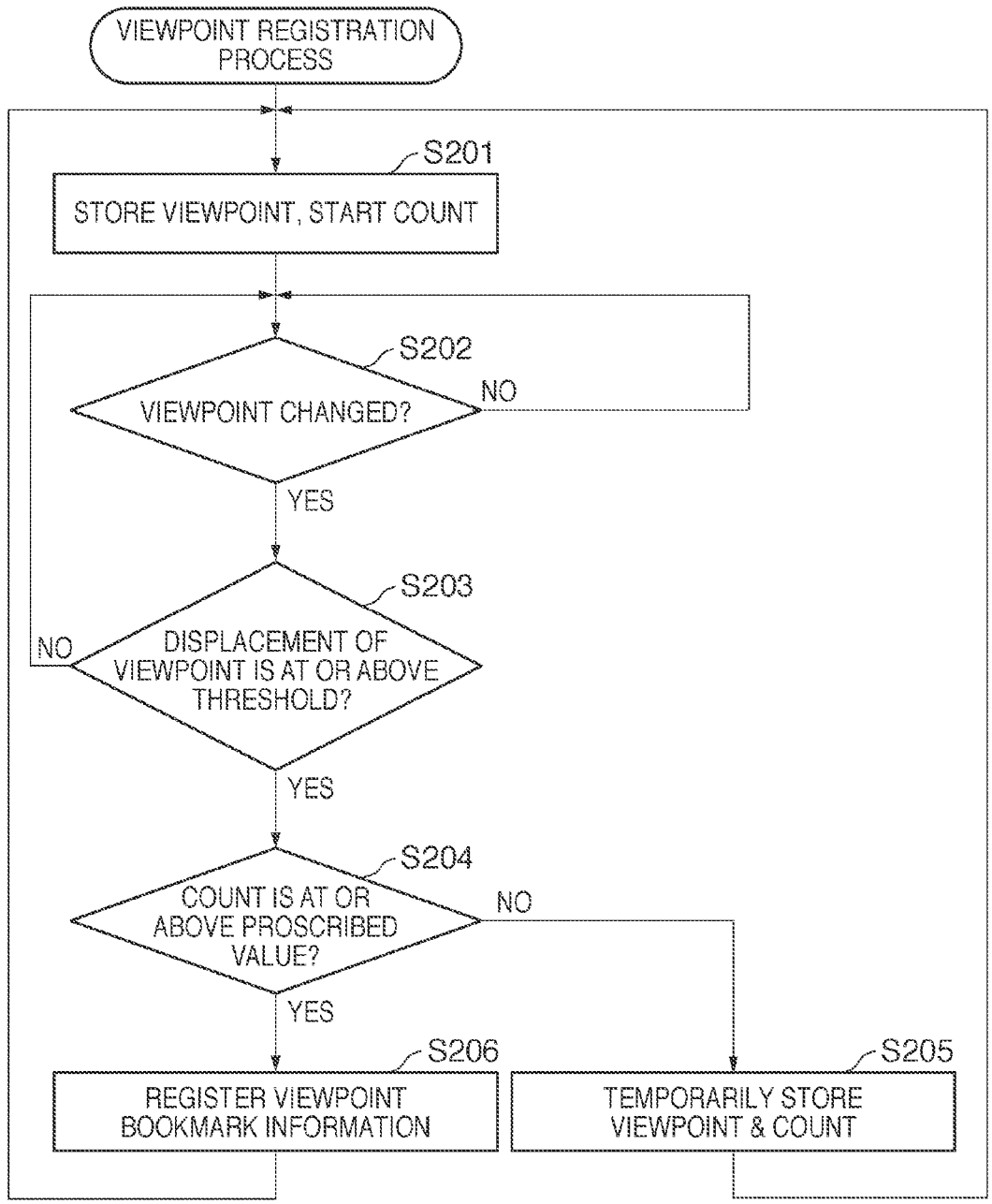

FIG. 3

| IDENTIFICATION INFORMATION | VIEWPOINT BOOKMARK INFORMATION | | | CAPTURED VIEWPOINT INFORMATION | | |
|---|---|---|---|---|---|---|
| | VIEWPOINT POSITION | VIEWPOINT DIRECTION | VIEWPOINT ANGLE OF VIEW | CAPTURED POSITION | CAPTURED DIRECTION | CAPTURED ANGLE OF VIEW |
| PLACE A, SPORTS A | $(x_1, y_1, h_1)$ | $(\alpha_1, \beta_1)$ | $(\gamma_1, \theta_1)$ | $(x_{A1}, y_{B1}, z_{C1})$ $(x_{D1}, y_{E1}, z_{F1})$ ... | $(\alpha_{G1}, \beta_{H1})$ $(\alpha_{I1}, \beta_{J1})$ ... | $(\gamma_{K1}, \theta_{L1})$ $(\gamma_{M1}, \theta_{N1})$ ... |
| PLACE B, SPORTS A | $(x_2, y_2, h_2)$ | $(\alpha_2, \beta_2)$ | $(\gamma_2, \theta_2)$ | $(x_{A2}, y_{B2}, z_{C2})$ ... | $(\alpha_{G2}, \beta_{H2})$ ... | $(\gamma_{K2}, \theta_{L2})$ ... |
| PLACE C, SPORTS B, TEAM NAME A | $(x_3, y_3, h_3)$ | $(\alpha_3, \beta_3)$ | $(\gamma_3, \theta_3)$ | $(x_{A3}, y_{B3}, z_{C3})$ ... | $(\alpha_{G3}, \beta_{H3})$ ... | $(\gamma_{K3}, \theta_{L3})$ ... |
| PLACE D, SPORTS B, TEAM NAME A | $(x_4, y_4, h_4)$ | $(\alpha_4, \beta_4)$ | $(\gamma_4, \theta_4)$ | $(x_{A4}, y_{B4}, z_{C4})$ ... | $(\alpha_{G4}, \beta_{H4})$ ... | $(\gamma_{K4}, \theta_{L4})$ ... |

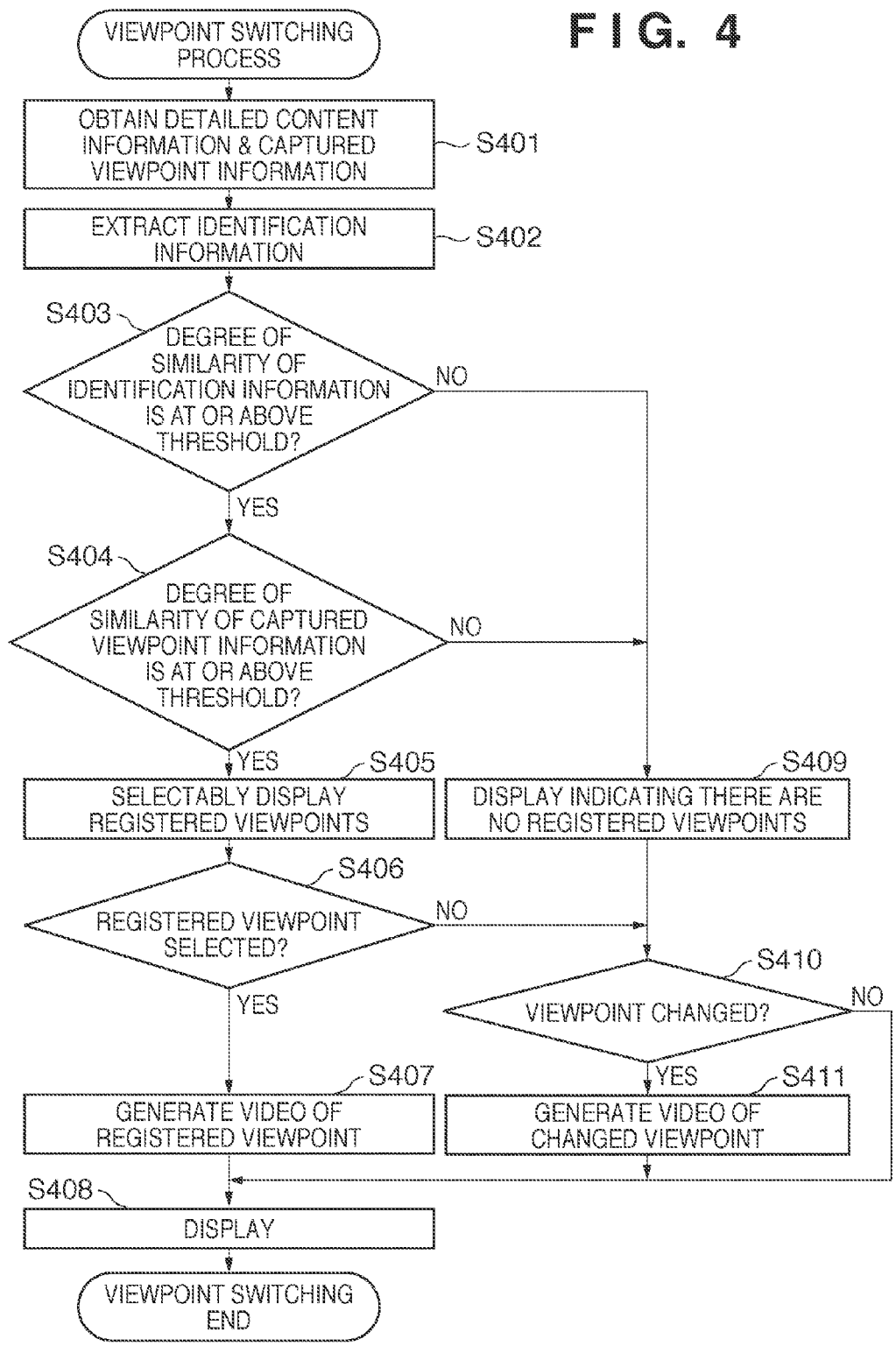

| SCREEN CURRENTLY BEING VIEWED | | | | |
|---|---|---|---|---|
| THE FOLLOWING VIEWPOINTS ARE AVAILABLE FOR SELECTION. | | | | |
| | IDENTIFICATION INFORMATION | VIEWPOINT BOOKMARK INFORMATION | | |
| | | VIEWPOINT POSITION | VIEWPOINT DIRECTION | VIEWPOINT ANGLE OF VIEW |
| VIEWPOINT 1 | PLACE A, SPORTS A | $(x_1, y_1, h_1)$ | $(\alpha_1, \beta_1)$ | $(\gamma_1, \theta_1)$ |
| VIEWPOINT 2 | PLACE B, SPORTS A | $(x_2, y_2, h_2)$ | $(\alpha_2, \beta_2)$ | $(\gamma_2, \theta_2)$ |

VIDEO PROCESSING APPARATUS THAT STORES INPUT VIEWPOINT INFORMATION AND CONTROL METHOD THEREOF

BACKGROUND OF THE INVENTION

1. Field of the Invention

The present invention relates to a video processing apparatus for receiving video content constituted by video captured at a plurality of viewpoint positions, and a control method thereof.

2. Description of the Related Art

In recent years, research and development into delivery technologies for various video content has been carried out as a result of the growth in broadcasting technologies such as digital television broadcasting.

With delivery technologies for multi-viewpoint video, which is also known as multi-angle broadcasting, a user is able to view video content from a desired viewpoint as a result of distributing multiplexed video captured at a plurality of positions for a single video content. Research is also being conducted into "arbitrary viewpoint video" technology that utilizes video captured at a plurality of positions included in multi-viewpoint video. Arbitrary viewpoint video technology involves generating video of a viewpoint at a position that has not actually been captured, from video captured at a plurality of positions included in multi-viewpoint video, and utilization in video content such as live broadcasts of sporting events is under consideration. Utilizing this arbitrary viewpoint video technology enables the user to be provided with an immersive feeling as though he or she was actually moving around inside the space of the video content while viewing. Japanese Patent Laid-Open No. 2007-150747, in order to seamlessly realize switching of viewpoints when playback is switched from normal broadcast video to arbitrary viewpoint video, discloses a technique in which information on the viewpoint selected when switching to arbitrary viewpoint video is controlled in accordance with switching from the viewpoint of normal broadcast video.

Japanese Patent Laid-Open No. 2010-088017 discloses a technique relating to viewpoint switching in the case of receiving a program (video content) in which timeslots during which viewpoint switching is available are interspersed with timeslots during which viewpoint switching is not available. Specifically, with Japanese Patent Laid-Open No. 2010-088017, information on a viewpoint that a user has switched to in a timeslot during which viewpoint switching is available is stored, and when a timeslot during which viewpoint switching is available arrives again after a timeslot during which viewpoint switching is not available, switching is performed to the stored viewpoint of the program.

With the technique disclosed in Japanese Patent Laid-Open No. 2010-088017, storing information on a viewpoint enables the viewpoint to be represented in the same program. However, a viewpoint selected in one program cannot be represented in another program having similar content. Thus, even in the case where a user views programs having similar content, the user needs to perform troublesome operations in order to set a desired viewpoint position every time a program is viewed.

SUMMARY OF THE INVENTION

The present invention has been made in consideration of such issues with conventional technology. The present invention provides a video processing apparatus that is able to easily select a viewpoint already registered for video content that is similar to video content targeted for display.

According to one aspect of the present invention, there is provided a video processing apparatus for processing video content constituted by a plurality of videos captured at a plurality of respectively different viewpoint positions, comprising: input unit configured to receive, as a user input, a viewpoint of video to be displayed that of the video content; storing unit configured to store input viewpoint information indicating the viewpoint received by the input unit, in association with at least one of identification information for identifying the video content and captured viewpoint information that includes information on the plurality of viewpoint positions at which the plurality of videos constituting the video content are captured; and control unit configured to perform control for displaying, as a viewpoint selectable with the input unit, the viewpoint corresponding to the input viewpoint information stored in the storing unit, based on information stored in the storing unit and at least one of identification information and captured viewpoint information of video content targeted for display that is different from the video content.

According to another aspect of the present invention, there is provided a control method of a video processing apparatus for processing video content constituted by a plurality of videos captured at a plurality of respectively different viewpoint positions, comprising: an input step of receiving, as a user input, a viewpoint of video to be displayed that of the video content; a storing step of storing input viewpoint information indicating the viewpoint, received in the input step, in storing unit, in association with at least one of identification information for identifying the video content and captured viewpoint information that includes information on the plurality of viewpoint positions at which the plurality of videos constituting the video content are captured; and a control step of performing control for displaying, as a viewpoint selectable in the input step, the viewpoint corresponding to the input viewpoint information stored in the storing unit, based on information stored in the storing unit and at least one of identification information and captured viewpoint information of video content targeted for display that is different from the video content.

Further features of the present invention will become apparent from the following description of exemplary embodiments (with reference to the attached drawings).

BRIEF DESCRIPTION OF THE DRAWINGS

FIG. 1 is a block diagram showing a functional configuration of a set-top box according to an embodiment.

FIG. 2 is a flowchart of a viewpoint registration process according to an embodiment.

FIG. 3 is a diagram for describing viewpoint bookmark information.

FIG. 4 is a flowchart of a viewpoint switching process of Embodiment 1.

DESCRIPTION OF THE EMBODIMENTS

Embodiment 1

Figures 5, 6:
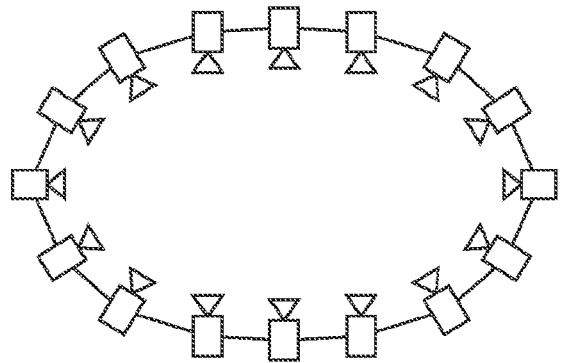
FIG. 5 is a diagram for describing a degree of similarity of captured viewpoint information.
FIG. 6 is a diagram showing a display example of GUI data for selecting a viewpoint bookmark.

Hereinafter, preferred embodiments of the present invention will be described in detail with reference to the drawings. Note that in the embodiments described below, an example is given in which the present invention is applied to a set-top box that receives multi-viewpoint video and is capable of generating video of an arbitrary viewpoint in video content of the multi-viewpoint video, as one example of a video processing apparatus. However, the present invention is applicable to an arbitrary device capable of generating video of an arbitrary viewpoint in video content. Having the function of receiving multi-viewpoint video is not essential, and the present invention can also be applied to a playback apparatus capable of playing multi-viewpoint video content stored on a recording medium such as a DVD (Digital Versatile Disc) and a memory card, for example.

FIG. 1 is a block diagram showing a functional configuration of a set-top box 100 according to an embodiment of the present invention.

A control unit 101, which is a CPU, for example, controls the operations of the blocks provided in the set-top box 100, by reading out operating programs for the blocks comprised in the set-top box 100 from a ROM 102, and expanding and executing the read operating programs in a RAM 103.

The ROM 102, which is a rewritable non-volatile memory, stores setting parameters required in the operations of the blocks, GUI data to be superimposed on video, and the like, in addition to the operating programs of the blocks comprised in the set-top box 100. Also, the ROM 102 stores information on an arbitrary viewpoint of multi-viewpoint video received by an after-mentioned video reception unit 105, the information being generated from the multi-viewpoint video. The RAM 103, which is a rewritable volatile memory, is used as an area for temporarily storing information, calculation results and the like acquired with the operations of the blocks of the set-top box 100.

An operation input unit 104, which is a block comprised in the set-top box 100 for accepting instruction input to the set-top box 100, sends input operation content to the control unit 101. The operation input unit 104 analyzes an operational signal received when a user performs an operation using a remote controller or the like, for example, and outputs an analyzed instruction signal to the control unit 101 as a control signal.

The video reception unit 105, which is a block for decoding an encoded video signal input to the set-top box 100, outputs a video signal acquired by decoding to an after-mentioned viewpoint video generation unit 107. The set-top box 100 of the present embodiment is capable of receiving multi-viewpoint video relating to a single video content acquired by multiplexing a plurality of video streams captured at a plurality of mutually different viewpoint positions. Note that in the present embodiment the set-top box 100 is described as receiving a broadcast signal propagated by broadcast waves such as a digital television broadcast, for example, extracting a video signal relating to a channel to be viewed, and performing decoding with the video reception unit 105. However, the video input method of the present invention is not limited to reception of broadcast waves, and may be a method of receiving video content via a network such as an Internet connection, for example.

An additional information reception unit 106 obtains additional information relating to video decoded by the video reception unit 105, and outputs the obtained additional information to the control unit 101. The additional information is constituted by detailed content information such as the program title, genre, cast members and keywords of received video content, and captured viewpoint information having the captured position, captured direction and captured angle of view (view angle) of video of a plurality of captured viewpoints included in multi-viewpoint video. Note that detailed content information can be obtained from content description metadata formulated by the TV-Anytime Forum, for example, or an EIT (Event Information Table) included in the TS (Transport Stream) signal of a received broadcast signal. Also, in the present embodiment the method of receiving additional information is described as the set-top box 100 extracting additional information from a received broadcast signal, but the method of receiving additional information is not limited thereto, and may be a method of obtaining additional information through a network via an unshown network I/F, for example.

The viewpoint video generation unit 107 is a block for generating video of an arbitrary viewpoint designated by a user as a result of performing a composition process, from video captured at a plurality of viewpoint positions included in the multi-viewpoint video input from the video reception unit 105. Specifically, once information on a viewpoint that the user wants to view is input from the operation input unit 104, the control unit 101 outputs the input information on the viewpoint to the viewpoint video generation unit 107, and causes the viewpoint video generation unit 107 to generate video of the viewpoint. Note that an existing method may be used as the method for generating video of an arbitrary viewpoint from multi-viewpoint video, such as the method disclosed in the aforementioned Japanese Patent Laid-Open No. 2007-150747, or a method that involves texture mapping from video of a required viewpoint onto a three-dimensional model acquired by determining a three-dimensional position of an object using an optical flow. Also, the set-top box 100 of the present embodiment is not required to only perform output of video of an arbitrary viewpoint generated from multi-viewpoint video, and is assumed to be capable of outputting video of a specific captured position included in multi-viewpoint video, normal video content other than multi-viewpoint video, and the like. The set-top box 100 of the present embodiment is described as having a mode for generating video of an arbitrary viewpoint from multi-viewpoint video, and a normal mode for outputting a received video signal without processing. That is, the viewpoint video generation unit 107 only performs the video generation process in the mode for generating video of an arbitrary viewpoint, and, in the case of the normal mode, can output an input video signal directly to a composition unit 108, since the video generation process does not need to be performed.

The composition unit 108 composes GUI data read out from the ROM 102 by the control unit 101 and input to the composition unit 108, with the video signal input from the viewpoint video generation unit 107, and outputs the composition result to a display apparatus connected to the set-top box 100 so as to be displayed.

A timer 109, which is a system timer provided in the set-top box 100, holds information on a time set in the set-top box 100. The timer 109, which is also used in order to measure (count) a time period starting from an arbitrary timing, starts the count on receiving an instruction from the control unit 101 to start the count, and increments the count in accordance with the passage of time.

Viewpoint Registration Process

Processing will be described in detail with further reference to the flowchart of FIG. 2, with regard to a viewpoint registration process of the set-top box 100 of the present embodiment having a configuration such as the above. The processing corresponding to the flowchart can be realized by the control unit 101 reading out a corresponding processing program stored in the ROM 102, for example, and expanding and executing the read program in the RAM 103. Note that this viewpoint registration process is described as being started when an input for switching to the mode for generating and displaying video of an arbitrary viewpoint is performed by the user on the operation input unit 104, for example. Also, it is assumed that when the mode for generating and displaying video of an arbitrary viewpoint is started, video of a default viewpoint that is preset by the content creator is generated.

At S201, the control unit 101 temporarily stores information on the viewpoint currently being viewed in the RAM 103 as a registration candidate viewpoint, and causes the timer 109 to start the count. Note that information on the viewpoint currently being viewed may be obtained from additional information input from the additional information reception unit 106, for example, or information on a viewpoint changed by the operation input unit 104 may be stored separately to the registration candidate viewpoint in the ROM 102.

At S202, the control unit 101 judges whether an input for changing at least one of the position, direction and angle of view of the viewpoint has been performed by the operation input unit 104. The control unit 101 moves the processing to S203 if it is judged that the viewpoint has been changed, and repeats the processing of S202 if it is judged that the viewpoint has not been changed. Note that when an input for changing the viewpoint has been performed by the operation input unit 104, the control unit 101 updates the information on the current viewpoint stored in the RAM 103 independently of the viewpoint registration process, and causes the viewpoint video generation unit 107 to generate and output video of the current viewpoint.

At S203, the control unit 101 reads out information on the viewpoint changed by the operation input from the operation input unit 104 and information on the registration candidate viewpoint from the RAM 103, and compares the values of the position, direction and angle of view of the two viewpoints. The control unit 101 moves the processing to S204 if the differences in value of at least one of the position, direction and angle of view of the two viewpoints is greater than or equal to respective position, direction and angle of view thresholds preset in the ROM 102. The control unit 101 returns the processing to S202 if the differences in value of the position, direction and angle of view of the two viewpoints are all less than the thresholds. That is, inadvertently registering a large number of viewpoints as registration candidate viewpoints can be prevented by performing the viewpoint judgment in this step.

At S204, the control unit 101 judges whether the counter started at S201 is greater than or equal to a prescribed viewing time period preset in the ROM 102. That is, the control unit 101 judges whether the registration candidate viewpoint has been continuously viewed for a prescribed time period of greater, and advances the processing to S206 if viewed for a prescribed time period of greater, and moves the processing to S205 if the viewing time period is less than the prescribed time period.

At S206, the control unit 101 registers the information on the registration candidate viewpoint stored in the RAM 103 in the ROM 102 as viewpoint bookmark information (input viewpoint information). At this time, the control unit 101 stores captured viewpoint information of the video content currently being viewed and identification information enabling the video content to be specified, in association with the information on the viewpoint to be registered. The identification information can be any kind of information extracted from the detailed content information included in the additional information that enables the video content to be specified, and in the present embodiment string information such a program title, a keyword, a series identifier indicating that the video content is part of a series, or the like extracted from the detailed content information is registered as identification information. The control unit 101 returns the processing to S201 once information on the viewpoint is registered, and performs measurement for registering a new viewpoint.

Note that in the case where it is judged that the viewing time period of the registration candidate viewpoint stored in the RAM 103 is less than the prescribed time period, the control unit 101, at S205, stores the current counter value in the RAM 103 together with the registration candidate viewpoint as a past registration candidate viewpoint, and returns to S201. Note that after having moved the processing from S205 to 5201, the control unit 101 stores information on the new viewpoint in the RAM 103 as the registration candidate viewpoint. Subsequently, the viewpoint is changed, and if the differences between the position, direction and angle of view of the changed viewpoint and the position, direction and angle of view of the past registration candidate viewpoint stored at S205 are all less than thresholds respectively set therefor, the control unit 101 can perform the following processing. The control unit 101 judges that the past registration candidate viewpoint is being viewed again as a result of the viewpoint change, reads the value of the counter associated with the past registration candidate viewpoint, and restarts the count from the read count value. It is thereby also possible to register information on a viewpoint with respect to which the total viewing time period is greater than or equal a prescribed time period. As for viewpoint registration, a method that involves registering a viewpoint favored by the user may be used, apart from a method for automatically registering a viewpoint such as shown in FIG. 2.

The set-top box 100 of the present embodiment is thus able to automatically store a viewpoint with a high viewing frequency in the ROM 102 as viewpoint bookmark information (input viewpoint information), from among the viewpoints viewed by the user. Viewpoint bookmark information and identification information and captured viewpoint information stored in association with the viewpoint bookmark information are as shown in FIG. 3, for example. Viewpoint bookmark information is information on a viewpoint that has been viewed for a prescribed time period, and is constituted by a three-dimensional position (x, y, z) of the viewpoint, a direction of the viewpoint (horizontal angle $\alpha$, elevation angle $\beta$), and an angle of view (horizontal angle of view $\gamma$, vertical angle of view $\theta$) of the viewpoint. Also, identification information is constituted by string information extracted from detailed content information such as the program title, genre, cast members and keywords. Further, captured viewpoint information is, similarly to viewpoint bookmark information, constituted by information on the captured position, captured direction and captured angle of view of video captured at a plurality of positions included in multi-viewpoint video, with information on a plurality of captured viewpoints being allocated to a single piece of viewpoint bookmark information.

Note that by further storing information on the registration time in association with viewpoint bookmark information when registering a viewpoint, it is also possible to automatically erase viewpoint bookmark information. In this case, if it is judged that there is information on a viewpoint with respect to which a prescribed time period has elapsed since the registration time, for example, the control unit 101 can delete information on the viewpoint from the ROM 102.

Viewpoint Switching Process

Next a viewpoint switching process of the set-top box 100 of the present embodiment will be described in detail, with further reference to the flowchart of FIG. 4. Processing corresponding to the flowchart can be realized by the control unit 101 reading out a corresponding processing program stored in the ROM 102, for example, and expanding and executing the read program in the RAM 103. Note that this viewpoint switching process is described as being started when an input for switching to the mode for generating and displaying video of an arbitrary viewpoint is performed on the operation input unit 104 by the user, for example, and is repeatedly executed in the mode for generating and displaying video of an arbitrary viewpoint. That is, this viewpoint switching process is executed in parallel with the aforementioned viewpoint registration process.

Note that it is assumed that when the mode for generating and displaying video of an arbitrary viewpoint is started, video of a default viewpoint that is preset by the content creator and described in the detailed content information received together with the video content, for example, is generated. This viewpoint switching process may also be configured to start when video content that enables video of an arbitrary viewpoint to be generated is received, rather than only being started when an input for switching to the mode for generating and displaying video of an arbitrary viewpoint is performed. For example, this viewpoint switching process may be started when a broadcast program distributing video content that enables video of an arbitrary viewpoint to be generated starts. Also, this viewpoint switching process may be started when switching from the channel of a broadcast program of normal single viewpoint video to the channel of a broadcast program distributing video content that enables video of an arbitrary viewpoint to be generated.

Note that this viewpoint switching process aims to enable the user to easily view video of registered viewpoints, in the case where information on a viewpoint registered in the viewpoint registration process that relates to the video content currently being viewed exists in the ROM 102. Also, in the present embodiment, in order to facilitate description, this viewpoint switching process is described in the case where only one piece of information on a viewpoint registered in the aforementioned viewpoint registration process is stored in the ROM 102.

At S401, the control unit 101 obtains additional information relating to the video content currently being viewed from the additional information reception unit 106. Specifically, the control unit 101 obtains additional information from the additional information reception unit 106, in order to judge in an after-mentioned step whether information on a viewpoint registered in the ROM 102 is information on a viewpoint of video content similar to the video content currently being viewed. Note that additional information in the present embodiment denotes detailed content information and captured viewpoint information of video content.

At S402, the control unit 101 extracts string information that will serve as identification information of the video content currently being viewed, from the detailed content information received at S401. In the present embodiment, identification information of the video content currently being viewed is described as being information registered as a keyword (place information, genre information, detailed genre information, etc.) or information obtained by extracting a keyword from character strings included in detailed content information. However, identification information is not limited to the above-mentioned information, and may be any information that enables video content to be specified.

At S403, the control unit 101 calculates the degree of similarity between identification information of the video content currently being viewed and identification information associated with the viewpoint bookmark information stored in the ROM 102. Specifically, the control unit 101 calculates the degree of similarity between the string information of two pieces of identification information with a ratio (degree of matching) such as (number of matching characters)/(total number of characters), for example, and judges whether the acquired ratio is greater than or equal to a threshold at which identification information prestored in the ROM 102 is regarded as matching. The control unit 101 moves the processing to S404 if it is judged that two or more pieces of identification information match, and moves the processing to S409 if it is judged that no two pieces of identification information match or if viewpoint bookmark information does not exist.

At S404, the control unit 101 further calculates the degree of similarity between the captured viewpoint information of the video content currently being viewed and captured viewpoint information associated with viewpoint bookmark information stored in the ROM 102. In the present embodiment, the control unit 101 derives, for each of the two pieces of captured viewpoint information, an area that is enclosed when all of the captured positions are two-dimensionally connected as shown in FIG. 5, and calculates the ratio of the overlapping area of the two areas with the following equation. Note that the case where the area is specified using only information on the captured position out of information on the captured position, captured direction and captured angle of view included in the captured viewpoint information is illustrated in FIG. 5, and that the degree of similarity of the captured viewpoint information can be calculated using only information on the captured position. However, the degree of similarity may be calculated using information on the captured direction and captured angle of view as well as information on the captured position, in order to calculate the degree of similarity between two pieces of captured viewpoint information more accurately.

Ratio of overlapping areas [%]=Overlapping area of two areas/((area of captured viewpoint currently being viewed+area of registered captured viewpoint)/2)

The control unit 101 judges whether the ratio of overlapping areas thus calculated, that is, the degree of similarity between the two pieces of captured viewpoint information, is greater than or equal to a threshold (e.g., 80%) at which captured viewpoint information prestored in the ROM 102 is regarded as matching. The control unit 101 moves the processing to S405 if it is judged that the degree of similarity between the two pieces of captured viewpoint information is greater than or equal to the threshold, and moves the processing to S409 if it is judged that the degree of similarity between the two pieces of captured viewpoint information is less than the threshold.

Note that, here, the case where the processing of both S403 and S404 is performed is given as an example in the description, but a configuration may also be adopted in which only the processing of one of S403 and S404 is performed. In other words, a configuration may also be adopted in which the degree of similarity is determined using only one of identification information or captured viewpoint information.

At S405, the control unit 101 reads out GUI data indicating that registered viewpoint bookmark information exists and is selectable as a viewpoint from the ROM 102, outputs the read GUI data to the composition unit 108, and causes the composition unit 108 to compose the video signal currently being viewed and the GUI data and output the composition result.

FIG. 6 is a diagram showing a display example of GUI data for selecting a registered viewpoint bookmark of video content that is similar to video content currently being viewed. On this display screen, the viewpoints are displayed from the top in descending order of the degree of similarity of the captured viewpoint information ("Viewpoint 1" has a higher degree of similarity than "Viewpoint 2"). Note that in the case where there are a plurality of registered viewpoint bookmarks having the same degree of similarity of captured viewpoint information, the viewpoints are displayed from the top in descending order of the total viewing time period counted by the timer 109.

At S406, the control unit 101 judges whether a request to change the viewpoint to registered viewpoint bookmark information has been input from the operation input unit 104 as a result of the user having decided to change the viewpoint to registered viewpoint bookmark information. The control unit 101 moves the processing to S407 if a viewpoint change request has been input from the operation input unit 104, and moves the processing to S410 if a viewpoint change request has not been input.

At S407, the control unit 101 reads out information on the selected viewpoint of viewpoint bookmark information registered in the ROM 102, outputs the read information to the viewpoint video generation unit 107, and causes the viewpoint video generation unit 107 to generate video of the viewpoint and output the generated video to the composition unit 108. Then at S408, the control unit 101 causes the composition unit 108 to output the video of the viewpoint of the viewpoint bookmark information to a connected display apparatus so as to be displayed.

At S403 and S404, the control unit 101 performs the following processing in the case where it is judged that viewpoint bookmark information registered in the ROM 102 does not correspond to the video content currently being viewed. The control unit 101 reads out GUI data indicating that viewpoint bookmark information corresponding to the video content currently being viewed does not exist from the ROM 102, outputs the read GUI data to the composition unit 108, and causes the composition unit 108 to compose the video signal currently being viewed and the GUI data and output the composition result.

Also, if viewpoint bookmark information corresponding to the video content currently being viewed does not exist, or if a viewpoint of viewpoint bookmark information is not selected at S406, the control unit 101 moves the processing to S410. Then at S410 the control unit 101 judges whether an input for changing at least one of the position, direction and angle of view of the viewpoint has been performed from the operation input unit 104. The control unit 101 moves the processing to S411 if it is judged that a change of viewpoint has been performed, and moves the processing to S408 if it is judged that a change of viewpoint has not been performed.

At S411, the control unit 101 outputs information on the changed viewpoint input from the operation input unit 104 to the viewpoint video generation unit 107, causes the viewpoint video generation unit 107 to generate video of the viewpoint and the composition unit 108 to output the generated video, and moves the processing to S408.

By thus executing the viewpoint registration process and the viewpoint switching process, the set-top box 100 of the present embodiment is able to easily select a viewpoint that has already been registered for video content that is similar to video content that is being received. Specifically, in the case where a viewpoint registered when viewing video content in the mode for generating and displaying video of an arbitrary viewpoint already exists, the set-top box 100 notifies the fact that it is possible to switch to a viewpoint used when video content was viewed in the past to the user. The user is thereby able to easily switch to a viewpoint used when video content was viewed in the past, without needing to perform the viewpoint change operation again.

As described above, a configuration can be adopted in which the video processing apparatus of the present embodiment is able to easily select a viewpoint already registered for video content similar to video content that is being received. Specifically, the video processing apparatus stores input viewpoint information which indicates on a viewpoint of video to be displayed that of video content constituted by a plurality of videos captured at a plurality of respectively different viewpoint positions. At this time, the input viewpoint information is stored in association with at least one of identification information for identifying the video content and captured viewpoint information that includes information on the plurality of viewpoint positions at which the plurality of videos constituting the video content are captured. The viewpoint corresponding to the stored input viewpoint information is displayed as a selectable viewpoint based on at least one of the identification information and the captured viewpoint information of the video content, when viewing video content that is different from the video content for which the input viewpoint information is already registered.

A desired viewpoint can be selected with a simple operation, without the user needing to perform complex operations for inputting a desired viewpoint every time video content that enables video of an arbitrary viewpoint to be generated is viewed.

Embodiment 2

In the above-mentioned Embodiment 1, a method of notifying a user, in the case where there is selectable viewpoint bookmark information relating to video content currently being viewed, by displaying GUI data indicating that switching is available together with the video content, was described. In the present embodiment, a method for further facilitating switching to a viewpoint desired by a user in the case where there is selectable viewpoint bookmark information, by displaying a preview of what video will look like after having switched to the viewpoint bookmark information, will be described. Note that since the set-top box 100 of the present embodiment has a similar configuration to the above-mentioned Embodiment 1, description of the functions and configuration will be omitted. Also, in the present embodiment, the case where a plurality of pieces of viewpoint bookmark information are registered in the ROM 102 will be described.

Viewpoint Switching Process

Figure 7A:
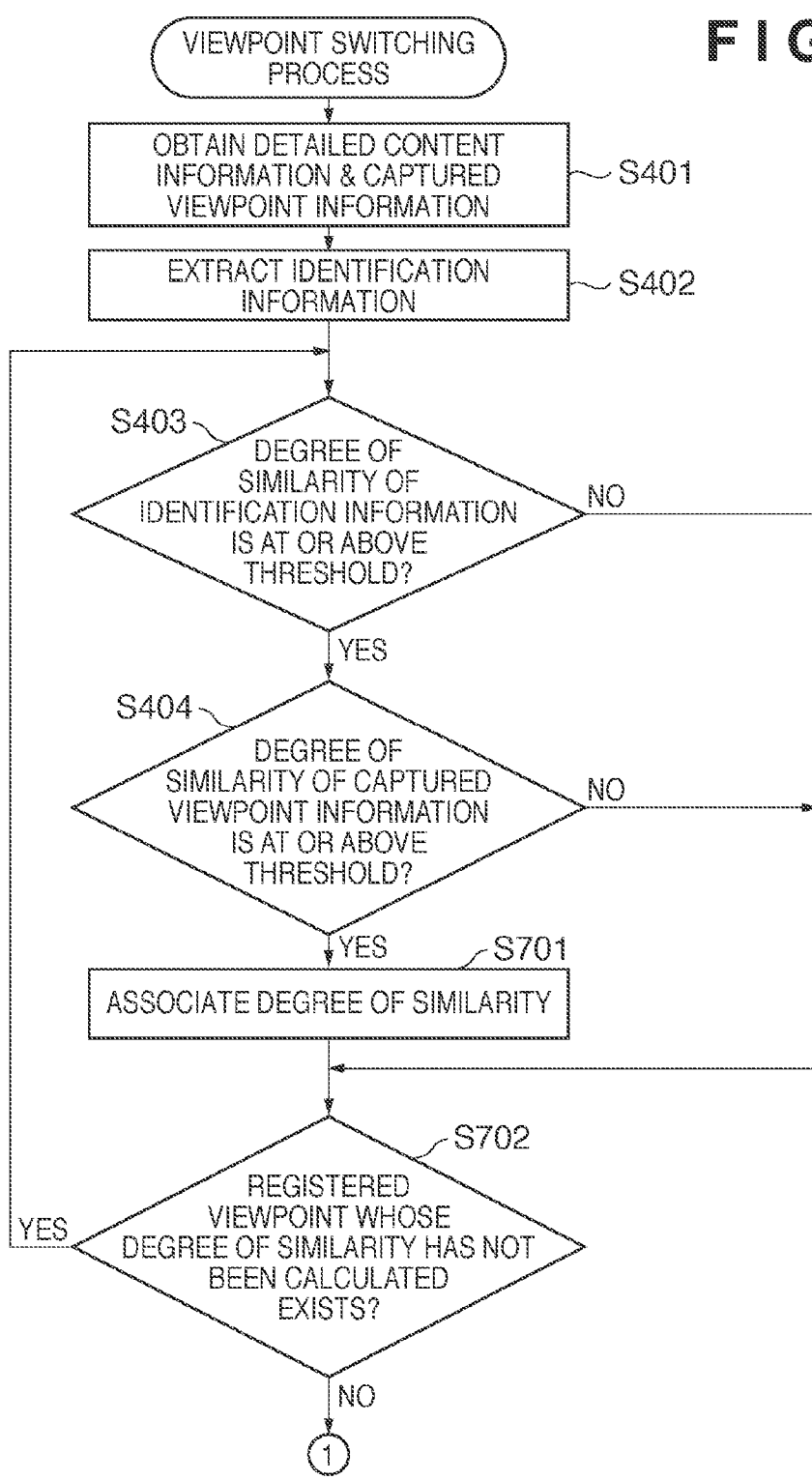
FIGS. 7A and 7B are flowcharts of a viewpoint switching process of Embodiment 2.
Figure 7B:
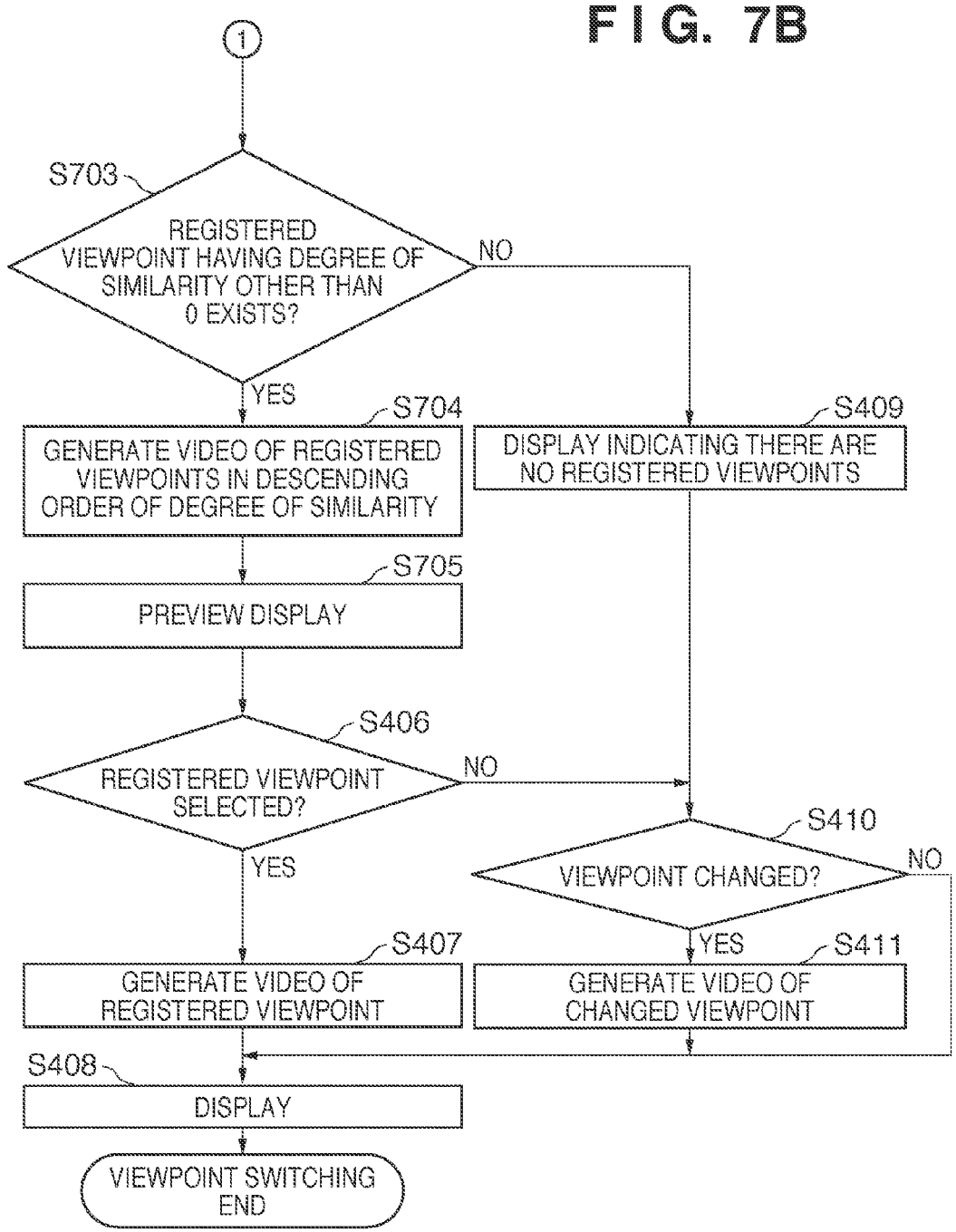

Hereinafter, a viewpoint switching process of the set-top box 100 of the present embodiment will be described in detail, with reference to the flowchart of FIGS. 7A and 7B. Note that in the viewpoint switching process of the present embodiment, the same reference numerals are given to steps for performing similar processing to the viewpoint switching process of the above-mentioned Embodiment 1, and description of these steps will be omitted, with description focusing on processing characteristic to the present embodiment. Note that this viewpoint switching process is also described as being started when an input for switching to the mode for generating and displaying video of an arbitrary viewpoint is performed on the operation input unit 104 by the user, for example, and being repeatedly executed in the mode for generating and displaying video of an arbitrary viewpoint.

Once string information that will serve as identification information of the video content currently being viewed is extracted from the detailed content information at S402, the control unit 101 applies the processing of S403, S404 and after-mentioned S701 and S702, with respect to each of the plurality of pieces of viewpoint bookmark information (input viewpoint information) registered in the ROM 102.

Specifically the control unit 101, at S403, selects one piece of viewpoint bookmark information whose degree of similarity has not been calculated, out of the plurality of pieces of viewpoint bookmark information registered in the ROM 102. Subsequently, the control unit 101 calculates the degree of similarity between identification information associated with the viewpoint bookmark information selected at S403 and identification information of the video content currently being viewed. The control unit 101 then judges whether the degree of similarity between two pieces of identification information is greater than or equal to a threshold at which identification information prestored in the ROM 102 is regarded as matching. If it is judged that the degree of similarity between two pieces of identification information is greater than or equal to the threshold, the control unit 101 stores the degree of similarity thereof in the RAM 103 and moves the processing to S404.

In the case where it is judged that the degree of similarity between two pieces of identification information is less than the threshold, the control unit 101 further stores a zero degree of similarity, for example, in the ROM 102 in association with viewpoint bookmark information associated with the identification information whose degree of similarity is being calculated. The control unit 101 then selects one piece of viewpoint bookmark information whose degree of similarity has still not been calculated, and again performs the processing of S403.

At S404, the control unit 101 calculates the degree of similarity between captured viewpoint information associated with the viewpoint bookmark information selected at S403 and the captured viewpoint information of the video content currently being viewed. The control unit 101 then judges whether the degree of similarity between the two pieces of captured viewpoint information is greater than or equal to a threshold at which captured viewpoint information prestored in the ROM 102 is regarded as matching. If it is judged that the degree of similarity between the two pieces of captured viewpoint information is greater than or equal to the threshold, the control unit 101 newly stores the degree of similarity thereof in the RAM 103 and moves the processing to S701.

If it is judged that the degree of similarity between the two pieces of captured viewpoint information is less than the threshold, the control unit 101 further stores a zero degree of similarity, for example, in the ROM 102 in association with the viewpoint bookmark information associated with the captured viewpoint information whose degree of similarity is being calculated. The control unit 101 then selects one piece of viewpoint bookmark information whose degree of similarity has still not been calculated, and again performs the processing of S403.

At S701, the control unit 101 further stores the cumulative value of the two degrees of similarity calculated at S403 and S404 in the ROM 102 in association with the viewpoint bookmark information selected at S403, as the degree of similarity of the viewpoint bookmark information. Then at S702, the control unit 101 judges whether there is a viewpoint bookmark whose degree of similarity has not been calculated in the plurality of viewpoint bookmark information registered in the ROM 102. The control unit 101 returns the processing to S403 if there is a viewpoint bookmark whose degree of similarity has not been calculated, and moves the processing to S703 if there is not. That is, once calculation of the degree of similarity is completed for all of the viewpoint bookmark information stored in the ROM 102, the control unit 101 moves the processing to S703.

At S703, the control unit 101 judges whether there is viewpoint bookmark information associated with a degree of similarity other than zero among the plurality of pieces of viewpoint bookmark information stored in the ROM 102. The control unit 101 moves the processing to S704 if there is viewpoint bookmark information with which a degree of similarity other than zero is associated, and moves the processing to S409 if the pieces of viewpoint bookmark information stored in the ROM 102 are all associated with a zero degree of similarity.

Figure 8:
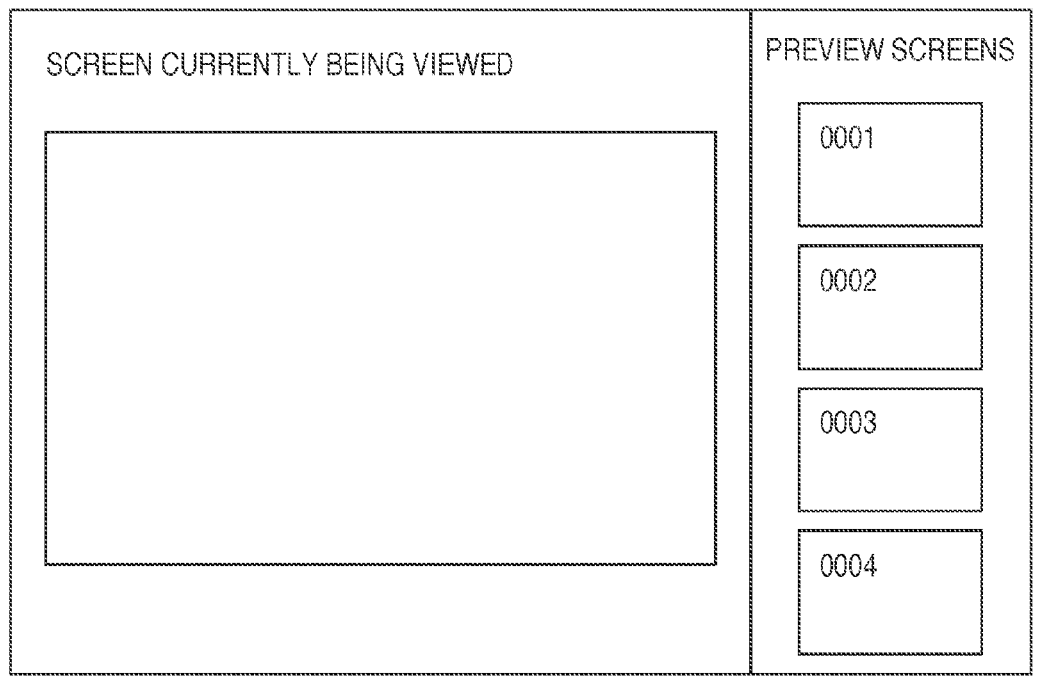
FIG. 8 is a diagram showing a screen display example of Embodiment 2.

At S704, the control unit 101 reads out information on the viewpoints of a prescribed number of pieces of viewpoint bookmark information in descending order of the degree of similarity from the plurality of pieces of viewpoint bookmark information stored in the ROM 102, and outputs the read information to the viewpoint video generation unit 107 as information on preview display viewpoints. The control unit 101 then causes the viewpoint video generation unit 107 to generate video of the preview display viewpoints, and causes the composition unit 108 to output the generated video so as to be displayed (S705). Video of the preview display viewpoints can be displayed alongside video of the viewpoint currently being viewed such as shown in FIG. 8, for example. In the example of FIG. 8, there are four videos of preview display viewpoints; that is, the video of the viewpoints of four pieces of viewpoint bookmark information is generated by the viewpoint video generation unit 107 in descending order of the degree of similarity from the top, from the plurality of pieces of viewpoint bookmark information stored in the ROM 102. The preview display video "0001" has a higher degree of similarity than the preview display video "0002", which has a higher degree of similarity than the preview display video "0003", which in turn has a higher degree of similarity than the preview display video "0004". In other words, the viewpoint video generation unit 107 of the present embodiment generates a prescribed number of videos of registered viewpoints that the user is able to select, in addition to the video of the viewpoint currently being viewed.

The set-top box 100 of the present embodiment can thus be configured to be able to facilitate selection of a viewpoint already registered for video content similar to video content that is being received. Specifically, in the case where viewpoints registered when viewing video content in the mode for generating and displaying video of an arbitrary viewpoint already exist, the set-top box 100 notifies information on viewpoints having a high degree of similarity with the video content currently being viewed as switchable viewpoints. At this time the user is able to switch the viewpoint while actually visually confirming what video will look like after the viewpoint has been switched, as a result of the set-top box 100 displaying the video of viewpoints having a high degree of similarity with the video content currently being viewed as a preview display. Note that in the case where a viewpoint desired by the user is not displayed when video of a prescribed number of viewpoints is displayed as a preview display in descending order of the degree of similarity, display may be switched, by a user instruction, to video of a prescribed number of subsequent viewpoints in descending order of the degree of similarity excluding the displayed viewpoints, for example.

Variations

In the above-mentioned Embodiments 1 and 2, the case where multi-viewpoint video is used to generate video of a viewpoint not included in the multi-viewpoint video was described, but the embodiments of the present invention are not limited thereto. For example, the present invention can also be applied to the case where a viewpoint of video to be displayed is selected from the video of viewpoints included in received multi-viewpoint video.

In this case, for example, the viewpoint switching process of FIG. 4 is started when multi-viewpoint video is received, and in the case where viewpoint bookmark information corresponding to the multi-viewpoint video is registered in the ROM 102, the following processing can be performed in the processing after S405. The control unit 101 can select video of a viewpoint corresponding to viewpoint bookmark information registered at S405 from multi-viewpoint video that is being received, and cause the video reception unit 105 to output the selected video to a display apparatus connected to the set-top box 100 so as to be displayed.

Other Embodiments

Aspects of the present invention can also be realized by a computer of a system or apparatus (or devices such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2010-126295 filed Jun. 1, 2010 and Japanese Patent Application No. 2011-073416 filed Mar. 29, 2011, which are hereby incorporated by reference herein in their entirety.

What is claimed is:

1. A video processing apparatus for processing video content including a plurality of videos which are respectively constructed of a plurality of image frames and captured at a plurality of respectively different viewpoint positions, comprising:

an input unit which receives, as a user input, a viewpoint of video of video content targeted for display;

a storing unit which stores input viewpoint information indicating the viewpoint received by the input unit when first video content is displayed, in association with at least one of identification information for identifying the first video content and captured viewpoint information that includes information on the plurality of viewpoint positions at which the plurality of videos constituting the first video content are captured; and a control unit which performs control for displaying, as a viewpoint selectable with the input unit when second video content, that is different from the first video content, is displayed, a viewpoint corresponding to the input viewpoint received by the input unit when the first video content is displayed, based on information stored in the storing unit and at least one of identification information and captured viewpoint information of the second video content targeted for display.

2. The video processing apparatus according to claim 1, wherein the control unit determines a degree of similarity between information stored in the storing unit and at least one of identification information and captured viewpoint information of the second video content targeted for display, and, if the degree of similarity is greater than or equal to a threshold, performs control for displaying, as a viewpoint selectable with the input unit when a second video content is displayed, a viewpoint corresponding to the input viewpoint received by the input unit when the first video content is displayed.

3. The video processing apparatus according to claim 1, wherein the viewpoint, which is received by the input unit, is capable of selecting and inputting the viewpoint of one of the plurality of videos constituting the video content targeted for display.

4. The video processing apparatus according to claim 1, wherein the viewpoint, which is received by the input unit, is capable of inputting an arbitrary viewpoint of the video content targeted for display, and the video processing apparatus further comprises a generation unit which generates video of the viewpoint received by the input unit, from the plurality of videos captured at the plurality of viewpoint positions constituting the video content targeted for display.

5. The video processing apparatus according to claim 2, wherein the control unit, in a case where a plurality of pieces of input viewpoint information are stored in the storing unit, performs control for displaying, in descending order of the degree of similarity, video of a prescribed number of viewpoints, among of the plurality of pieces of input viewpoint information stored in the storing unit and selectable with the input unit when the second video content is displayed.

6. The video processing apparatus according to claim 1, further comprising a measurement unit which measures a time period for which video of the viewpoint received by the input unit is displayed, wherein the storing unit, in a case where the time period for which video of the viewpoint received by the input unit is displayed reaches a prescribed time period, stores the input viewpoint information indicating the viewpoint.

7. The video processing apparatus according to claim 1, wherein the storing unit, when storing the input viewpoint information indicating the viewpoint received by the input unit, stores in association with the input viewpoint information a time at which the input viewpoint information is stored, and deletes the input viewpoint information stored in association with the time after a prescribed time has elapsed from the time.

8. The video processing apparatus according to claim 2, wherein the degree of similarity is calculated using a degree of matching with at least one type of string information of a program title, a genre, a cast member and a keyword included in the identification information.

9. A control method of a video processing apparatus for processing video content including a plurality of videos which are respectively constructed of a plurality of image frames and captured at a plurality of respectively different viewpoint positions, comprising:

an input step of receiving, as a user input, a viewpoint of video of video content targeted for display;

a storing step of storing input viewpoint information indicating the viewpoint, received in the input step when first video content is displayed, in storing unit, in association with at least one of identification information for identifying the first video content and captured viewpoint information that includes information on the plurality of viewpoint positions at which the plurality of videos constituting the first video content are captured; and a control step of performing control for displaying, as a viewpoint selectable in the input step when second video content, that is different from the first video content, is displayed, a viewpoint corresponding to the input viewpoint received in the input step when the first video content is displayed, based on information stored in the storing unit and at least one of identification information and captured viewpoint information of the second video content targeted for display.

10. The control method of claim 9, wherein the control step determines a degree of similarity between information stored in the storing unit and at least one of identification information and captured viewpoint information of the second video content targeted for display, and, if the degree of similarity is greater than or equal to a threshold, performs control for displaying, as a viewpoint selectable with the input step when a second video content is displayed, a viewpoint corresponding to the input viewpoint received by the input step when the first video content is displayed.

11. The control method of claim 9, wherein the viewpoint, which is received by the input step, is capable of selecting and inputting the viewpoint of one of the plurality of videos constituting the video content targeted for display.

12. The control method of claim 9, wherein the viewpoint, which is received by the input step, is capable of inputting an arbitrary viewpoint of the video content targeted for display, and the video processing apparatus further comprises a generation step which generates video of the viewpoint received by the input step, from the plurality of videos captured at the plurality of viewpoint positions constituting the video content targeted for display.

13. The control method of claim 9, wherein the control step, in a case where a plurality of pieces of input viewpoint information are stored in the storing unit, performs control for displaying, in descending order of the degree of similarity, video of a prescribed number of viewpoints, among of the plurality of pieces of input viewpoint information stored in the storing unit and selectable with the input step when the second video content is displayed.

14. The control method of claim 9, further comprising a measurement step which measures a time period for which video of the viewpoint received by the input step is displayed, wherein the storing step, in a case where the time period for which video of the viewpoint received by the input step is displayed reaches a prescribed time period, stores the input viewpoint information indicating the viewpoint.

15. The control method of claim 9, wherein the storing step, when storing the input viewpoint information indicating the viewpoint received by the input step, stores in association with the input viewpoint information a time at which the input viewpoint information is stored, and deletes the input viewpoint information stored in association with the time after a prescribed time has elapsed from the time.

16. The control method of claim 9, wherein the degree of similarity is calculated using a degree of matching with at least one type of string information of a program title, a genre, a cast member and a keyword included in the identification information.

* * * * *